April 10, 1945.                    O. C. MARTIN                    2,373,253
                              STRAIGHT THREAD FITTING
                            Original Filed May 26, 1941
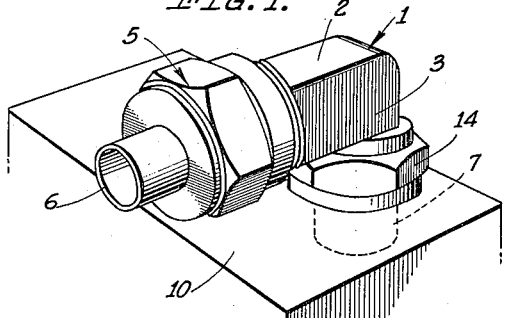
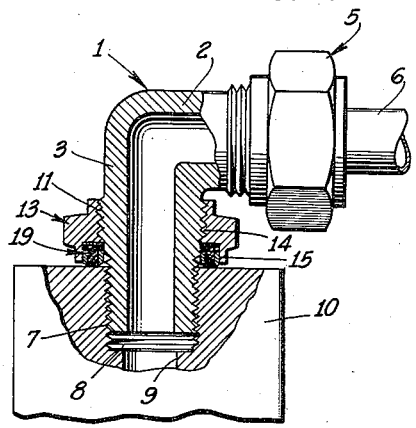
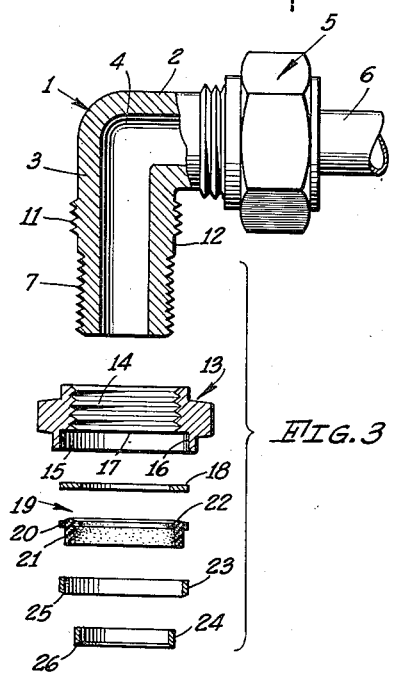
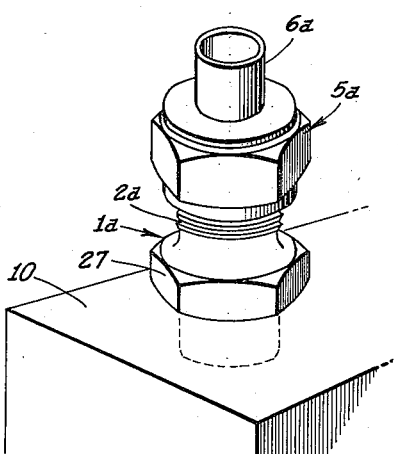
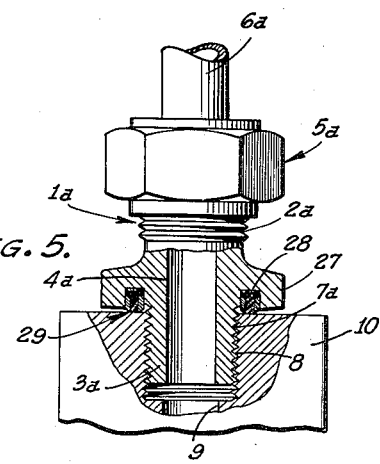
OTIS C. MARTIN,
INVENTOR
BY *Harold W. Mattingly*
ATTORNEY.

Patented Apr. 10, 1945

2,373,253

UNITED STATES PATENT OFFICE 2,373,253

STRAIGHT THREAD FITTING

Otis C. Martin, Los Angeles, Calif.

Original application May 26, 1941, Serial No. 395,202. Divided and this application September 16, 1943, Serial No. 502,672

7 Claims. (Cl. 285—55)

My invention relates to a straight thread pipe and tubing fitting and has particular reference to a fitting of the connector type such as is employed to connect a pipe or tubing line to valves and like fluid pressure devices.

This application is a continuation of my co-pending application Serial No. 395,202, filed May 26, 1941 on "Straight thread fitting."

In effecting connections of pipe and tubing lines to valves and like fluid pressure devices, it is the common practice to employ fittings which are adapted to be fixed upon the end of the pipe or tubing and connected to the fluid pressure device. I refer to this type of fitting as a "connector type" to distinguish from the "coupling type" employed to interconnect two pipes or tubes. The connection of the connector type fitting to the fluid pressure device is usually effected by means of a tapped or threaded bore provided in the device and engaging a male threaded portion of the connector fitting. To insure against leakage at this connection, tapered or pipe threads are employed.

While the tapered threads do provide an adequate fluid seal if properly employed, they also have certain inherent disadvantages. For example, it is substantially impossible to accurately predetermine the depth to which the fitting must be screwed into the threaded bore to provide the desired fluid seal since this depth is greatly affected by small variations in thread form, diameters of bore and body, and starting point of each of the threads. This is particularly a disadvantage in industries employing "mass production" methods, for example, the aircraft industry, since it positively precludes the desirable procedure of preforming the pipe and tubing line sections prior to assembly. When conventional taper thread fittings are used, the tubing line sections must be formed during the assembly operation because the required length of the sections cannot until then be determined, being dependent upon the depth to which the connector fittings are screwed into the fluid pressure device. Thus, considerable time is lost and the cost involved in individually forming each tubing section is greatly increased.

Furthermore, if it becomes necessary to remove a taper thread fitting, it will not upon replacement make up tight at the same location but must, in general, be screwed in to a greater depth in order to establish a fluid-tight joint.

In the case of taper thread elbow fittings, it is substantially impossible to establish the desired fluid seal and at the same time direct the free end of the fitting in the desired direction. Because of this fact, use is made of the expensive and not entirely satisfactory hollow bolt type of swivel fitting.

Another important disadvantage inherent in the use of taper thread fittings resides in the enormous bursting forces produced by the inter-engagement of the taper threads. As the fitting is screwed tightly into the threaded bore, these bursting forces tend to distort the body of the fluid pressure device and in some cases will actually burst the body unless great care is used in tightening the fittings. This disadvantage is in part avoided by making the bodies larger and heavier and by reinforcing that portion of the body which surrounds the threaded bore. This expedient is highly undesirable in aircraft construction where economy of space and weight is a consideration of prime importance.

All of the above noted disadvantages are avoided by the use of straight or bolt type threads, but no one prior to my invention has been able to effect an adequate fluid seal with such straight threads.

It is therefore an object of my invention to provide a pipe and tubing fitting of the connector type which overcomes the above noted disadvantages by employing straight or bolt type threads and by including means for providing an adequate fluid seal between the fitting and the fluid pressure device to which it is connected.

It is also an object of my invention to provide a fitting of the character set forth in the preceding paragraph, in which the fluid seal between the fitting and the fluid pressure device is independent of the threads.

It is an additional object of my invention to provide a fitting of the character set forth in the preceding paragraphs, which includes a flange extending outwardly from the threads in a position to engage the body of the fluid pressure device and which carries a sealing means for providing a fluid-tight seal between the flange and the fluid pressure device.

It is a still further object of my invention to provide a fitting of the character set forth in the preceding paragraphs which includes a lock means engageable with the fluid pressure device for locking the fitting in any desired angular position and in which said lock means carries a means providing a fluid seal between the fitting and the fluid pressure device.

It is also an object of my invention to provide a fitting of the character set forth hereinbefore in which the fluid passage through the fitting is entirely unrestricted.

It is additionally an object of my invention to provide a fitting of the character set forth hereinbefore, which is simple in construction and designed to permit the ready and economical manufacture thereof in large quantities.

Other objects and advantages of my invention will be apparent from a study of the following specifications, read in connection with the accompanying drawing, wherein Fig. 1 is a perspective view of an elbow type fitting embodying the principles of my invention;

Fig. 2 is a fragmentary vertical section through the fitting illustrated in Fig. 1;

Fig. 3 is an exploded sectional view illustrating the form and construction of the parts employed and their manner of assembly;

Fig. 4 is a perspective view of a straight through type of fitting embodying the principles of my invention; and Fig. 5 is a fragmentary vertical sectional view through the fitting illustrated in Fig. 4.

Referring to the drawing, I have illustrated in Figs. 1 through 3 an elbow type of connector fitting comprising a body portion 1 of elbow form which includes a pair of angularly disposed arm portions 2 and 3 and which has a fluid passage bore 4 formed therein. One of the arm portions, such as, for example, the arm portion 2, is fitted with a connection device 5 adapted to receive the end of a pipe or tubing line 6, secure said end to the fitting body 1, and provide a fluid seal between the body 1 and the tubing 6. The connection device 5 may be of any suitable type or construction, but preference is expressed for a connection device of the character disclosed and claimed in my copending application Serial No. 341,856, filed June 22, 1940, and entitled "Tube coupling."

The other arm portion 3 of the fitting is provided at its extremity with exterior screw threads 7. These threads are of the straight or bolt type in contra-distinction to the tapered or pipe type of threads conventionally employed on fittings of this character. The threads 7 are adapted to be engaged with similar straight bolt type threads 8 formed in a fluid passage bore 9 provided in the body portion 10 of the valve, motor or other fluid pressure device to which the fitting is connected.

A portion of the arm 3 disposed between the threads 7 and the arm 2 is made of somewhat larger diameter than the threaded portion 7 and is provided with external male threads 11. The threads 11 are spaced from the threads 7 so as to define between these threads a short cylindrical portion 12. The threads 11 are adapted to threadedly engage a lock nut 13 which is provided with corresponding internal threads 14. The lock nut 13 is preferably of hexagonal form, as is illustrated in Fig. 1, to permit tightening thereof as by means of a wrench, although other forms such as a cylindrical form having a knurled exterior may also be used.

The under surface of the nut 13 is recessed as indicated at 15 to provide a cylindrical side wall 16 having a diameter greater than the exterior diameter of the threads 11 and terminating in a shoulder 17. Within the recess 15 is positioned a sealing assembly which includes a thin washer 18 having exterior and interior diameters adjusted to permit the washer 18 to be closely but freely received within the annular space defined between the side walls 16 and the cylindrical portion 12 when the nut 13 is mounted upon the threads 11 in the manner illustrated in Fig. 2.

Below the washer 18 and disposed within the same annular recess, there is mounted a ring 19 of a suitable sealing material such as rubber, synthetic rubber, or other readily deformable, non-compressible material. I have found that "Neoprene," a form of synthetic rubber, is admirably suited for use as the sealing ring 19 since it exhibits excellent mechanical properties and is almost entirely resistant to the destructive action of gasoline, oils, greases and like hydrocarbon fluids.

The sealing ring 19 is preferably formed with a T-shaped cross section including a horizontal bar portion 20 of appreciable thickness and having a width corresponding to the radial width of the recess included between the cylindrical walls 12 and 16. From the horizontal bar portion 20 there depends a vertical leg portion 21 which has a radial thickness somewhat less than the radial width of the recess. The sealing 19 also includes an integrally formed ring-like portion 22 of curved cross section which is disposed on the upper side of the horizontal bar portion 20 and in substantially vertical alignment with the leg portion 21. The leg portion 21 is confined between outer and inner metallic sealing rings 23 and 24, each of which is provided with interior and exterior diameters adjusted to substantially completely fill the annular spaces disposed, respectively, between the leg portion 21 and the outer side wall 16 of the recess and between the leg 21 and the inner side wall or cylindrical surface 12 and to make substantial sliding fit with said side walls.

The radial thickness of the leg portion 21 is preferably made slightly larger than the radial spacing between the rings 23 and 24 so that when the ring 19 is assembled between the rings 23 and 24 in the manner illustrated in Fig. 2, the leg portion 21 will be under slight radial compression and the frictional inter-engagement of these three members resulting therefrom serves to prevent their becoming inadvertently disassociated from each other.

The lower edges of the rings 23 and 24 are preferably chamfered or tapered in opposite directions to provide relatively sharp lower cutting edges 25 and 26. The washer 18, sealing ring 19 and metallic sealing rings 23 and 24 are all assembled within the recess 15 in the manner illustrated in Fig. 2.

To connect the fitting 1 to the body 10 of the fluid pressure device, the sealing rings 19, 23 and 24 and the washer 18 are assembled within the interior of the recess 15 in the maner illustrated in Fig. 2 and the nut 13 is threadedly engaged upon the threaded portion 11 and screwed substantially to its uppermost position. Thereupon the fitting body 1 is connected to the fluid pressure device 10 by screwing the threaded portion 7 into the threaded bore 8 until further rotation of the body 1 is arrested by engagement of the under surface of the lock nut 13 with the upper surface of the fluid pressure device body 10. The fitting body 1 is then rotated in the opposite direction until the free arm portion 2 thereof is extended in the desired direction. While holding the fitting body 1 in this desired position, the lock nut 13 is rotated in a direction to move it downwardly over the threads 11 to thereby bring the sealing ring assembly 19, 23—24 into engagement with the upper surface of the body 10. Tightening the lock nut 13 will then operate to lock the fitting body 1 against rotation in the threads 7—8 and will at the same time provide a fluid seal between the fitting body 1 and the fluid pressure device 10.

As the nut 13 is screwed downwardly, the sharp edges 25 and 26 of the ring members 23 and 24 first engage the upper surface of the body 10 and as the nut 13 is further rotated, these sharp edges tend to bite into the upper surface of the body 10 and provide a sealing engagement therewith. At the same time, and laterally directed portions of the bar portion 20 of the resilient sealing ring 19, disposed between the metal rings and the base or bottom of the recess, are axially compressed between the upper edges of the rings 23 and 24 and the under surface of the washer 18. This produces a radial expansion of the bar portion 20, forcing the ends thereof into pressure engagement, respectively, with the inner cylindrical surface 16 of the nut 13 and the outer cylindrical surface 12 of the fitting body 1. At the same time, the pressure engagement between the under surface of the washer 18 and the upper surface of the crowned portion 22 of the resilient sealing ring 19 serves to distort the T-shape in that it causes an axial expansion of the leg portion 21 to force the lower end thereof into relatively high pressure engagement with the upper surface of the body 10.

It will thus be seen that any fluid which may leak past the relatively loose fitting threads 7—8 will be prevented from flowing between the nut 13 and the fitting body 1 by the seal provided at the cylindrical surface 12 and will also be prevented from flowing between the under surface of the nut 13 and the upper surface of the body 10 by the triple seal comprising the sharp edges 25 and 26 and the lower end of the leg portion 21 of the resilient sealing ring.

Attention is directed particularly to the crowned portion 22 of the resilient sealing ring 19 which produces a substantially greater pressure engagement with the upper surface of the body 10 than if such crowned portion were omitted.

Attention is also directed to the fact that by the construction above described, the fitting body 1 may be turned to any desired angular position, immovably locked in such position, and a fluid seal between the fitting body and the body of the device to which the fitting is attached may also be provided.

It is to be observed that the fluid passage 4 which extends through the fitting body 1 is completely unrestricted and provides a fluid passage having a cross section at all points which may be at least as large as the cross sectional area of the tube or pipe 6.

I have illustrated in Figs. 4 and 5 the manner in which the above described principles of my invention may be embodied in a straight through type of fitting. This form of fitting is similar to that previously described in that it includes a body portion 1a, upon the upper end 2a of which is affixed a connection device 5a affording a mechanical and fluid communicating connection with a pipe or tube 6a. A lower portion 3a of the fitting body 1a is provided with exterior male threads 7a of the straight or bolt type adapted to be engaged with the threads 8 formed on the interior of the bore 9 which is in turn formed in the body 10 of the fluid pressure device to which the fitting is attached. The body portion 1a includes also a longitudinally extending fluid passage bore 4a.

The essential difference in construction between the straight through type of fitting illustrated in Figs. 4 and 5 and the elbow type of fitting previously described lies in the fact that the body portion 1a has formed integrally therewith a flange-like enlargement 27 which corresponds to the lock nut 13 of the previously described modification in that it is formed on its under surface with an annular recess 28 within which is positioned a sealing ring assembly 29 identical in all respects to the sealing ring assembly previously described as comprising the sealing ring members 19, 23 and 24. Since in a straight through fitting there is no need to adjust the angular position of the fitting, the flange portion 27 may be formed integrally with the body 1a instead of being formed as a separate lock nut 13 as was the case with the elbow type of fitting.

In effecting engagement of the straight through fitting to the body 10, the fitting is merely screwed into the threaded bore 8 until the sealing assembly 29 engages the upper surface of the body 10. The flange portion 27 is preferably provided with a hexagonal contour to permit a wrench to be applied thereto, whereby the fitting may be tightened securely in the threaded engagement 7—8 to compress the resilient sealing ring member and effect the seal between the fitting body and the body of the fluid pressure device in the same manner as was previously described in connection with the elbow form of fitting.

Attention is directed to the fact that with both forms of the fitting above described, straight or bolt type threads are employed for securing the fitting to the fluid pressure device to which the fitting is attached, thereby avoiding all of the disadvantages previously referred to as attendant upon the use of the conventional taper thread type of fitting.

It is to be further noted that when installed, all similar fittings of any one size will involve precisely the same depth of penetration of the threaded portion of the fitting into the body of the fluid control device to which they are attached. Thus the tubing lines associated with such fittings may be formed to a fixed standard length and shape prior to assembly, with the assurance that upon assembly an accurate fit will be realized. Thus the straight type of fitting of my invention will permit the use of mass production methods in those industries which cannot now employ such methods because of the uncertainty involved in the use of the taper thread type of fitting.

While I have shown and described the preferred embodiment of my invention, I do not desire to be limited to any of the details of construction shown or described herein, except as defined in the appended claims.

I claim:

1. In a connector type tubing fitting for attachment to a fluid pressure device having a threaded opening thereon, the combination of: a fitting body having a fluid passage therethrough and including a cylindrical portion having straight bolt type external screw threads formed thereon engageable with said threaded opening; means on said body defining a radially extending flange surrounding said cylindrical portion, said flange having a flat bottomed annular recess formed in the under side thereof; and a sealing assembly carried in said recess comprising a ring of elastic material of T-shaped cross section disposed with the top of said T-shape against said flat bottom, and a pair of hard metal rings disposed on opposite sides of the leg of said T-shape, each of said rings having an axial length sufficient to extend below the under surface of said flange means.

2. In a connector type tubing fitting for attachment to a fluid pressure device having a threaded opening thereon, the combination of: a fitting body having a fluid passage therethrough and including a cylindrical portion having two sets of straight bolt type external screw threads formed thereon, said sets of threads being spaced apart axially of said cylindrical portion to define a smooth cylindrical seating surface between said sets of threads; a lock nut threaded upon the upper one of said sets of threads for movement after said cylindrical portion is screwed into said threaded opening to a position engaging said device and locking said body against rotation, said lock nut having a counterbored portion defining an annular recess in the under side of said lock nut adjacent said seating surface; a non-compressible elastic sealing ring in said recess; and means in said recess engageable with said device for forcing said sealing ring into pressure engagement with said device and said seating surface.

3. In a connector type tubing fitting for attachment to a fluid pressure device having a threaded opening thereon, the combination of a fitting body having a fluid passage therethrough and including a cylindrical portion having two sets of straight bolt type external screw threads formed thereon, said sets of threads being spaced apart axially of said cylindrical portion to define a smooth cylindrical seating surface between said sets of threads; a lock nut threaded upon the upper one of said sets of threads for movement after said cylindrical portion is screwed into said threaded opening to a position engaging said device and locking said part against rotation, said lock nut having a counterbored portion defining a flat bottomed annular recess in the under side of said lock nut adjacent said seating surface; and a sealing assembly carried in said recess comprising a ring of elastic material of T-shaped cross section disposed with the top of said T-shape against said flat bottom, and a pair of hard metal rings disposed on opposite sides of the leg of said T-shape, each of said rings having an axial length sufficient to extend below the under surface of said lock nut.

4. In a connector type tubing fitting for attachment to a fluid pressure device having a threaded opening thereon, the combination of: a fitting body having a fluid passage therethrough and including a cylindrical portion having straight bolt type external screw threads formed thereon engageable with said threaded opening; means on said body defining a radially extending flange surrounding said cylindrical portion, said flange having a flat bottomed annular recess formed in the under side thereof; and a sealing assembly disposed in said recess comprising a ring of elastic material of T-shaped cross section disposed with the top of said T-shape against the bottom of said recess and having a pair of hard metal rings disposed on opposite sides of the leg of said T-shape, each of said rings having an axial length sufficient to extend below the surface of said flange, and said T-shape including a protruding portion extending upwardly from the top of said T-shape and engaging the flat bottom of said recess.

5. In a connector type tube fitting for attachment to a fluid pressure device having a threaded opening thereon, the combination of: a fitting body having a fluid passage therethrough and including a cylindrical portion having screw threads formed thereon engageable with said threaded opening; means on said body defining a radially extending flange surrounding said cylindrical portion, said flange having in the underside thereof an annular recess having its opening facing toward the end of the threaded cylindrical portion of the body, a ring of elastic noncompressible plastic sealing material in said recess, and a metal ring in said recess of less radial width than the recess and projecting from said recess to engage the surface of the device as the fitting body is screwed therein and to be moved thereby toward the base of the recess, at least a portion of said sealing ring being disposed to lie between said metal ring and the base of the recess, whereby screwing of said cylindrical portion into said threaded opening will squeeze said sealing ring to thereby deform said sealing ring into sealing relation between said device and both side walls of said recess.

6. In a connector type tube fitting for attachment to a fluid pressure device having a threaded opening thereon, the combination of: a fitting body having a fluid passage therethrough and including a cylindrical portion having screw threads formed thereon engageable with said threaded opening; means on said body defining a radially extending flange surrounding said cylindrical portion, said flange having in the underside thereof an annular recess having its opening facing toward the end of the threaded cylindrical portion of the body, a ring of elastic non-compressible plastic sealing material in said recess, and a metal ring in said recess of less radial width than the recess and having a tapered cutting edge projecting from said recess to engage the surface of the device as the fitting body is screwed therein and to be moved thereby toward the base of the recess, at least a portion of said sealing ring being disposed to lie ebtween said metal ring and the base of the recess, whereby screwing of said cylindrical portion into said threaded opening will squeeze said sealing ring to thereby deform said sealing ring into sealing relation between said device and both side walls of said recess.

7. In a connector type tube fitting for attachment to a fluid pressure device having a threaded opening thereon, the combination of: a fitting body having a fluid passage therethrough and including a cylindrical portion having screw threads formed thereon engageable with said threaded opening; means on said body defining a radially extending flange surrounding said cylindrical portion, said flange having in the underside thereof an annular recess having its opening facing toward the end of the threaded cylindrical portion of the body, a ring of elastic non-compressible plastic sealing material in said recess, and a metal ring in said recess of less radial width than the recess and slidably fitting the exterior wall of the recess, said ring projecting from said recess to engage the surface of the device as the fitting body is screwed therein and to be moved thereby toward the base of the recess, at least a portion of said sealing ring being disposed to lie between said metal ring and the base of the recess, whereby screwing of said cylindrical portion into said threaded opening will squeeze said sealing ring to thereby deform said sealing ring into sealing relation between said device and both side walls of said recess.

OTIS C. MARTIN.